(12) United States Patent
Ingber et al.

(10) Patent No.: US 12,714,544 B1
(45) Date of Patent: Aug. 25, 2026

(54) DENTAL IMPLANT DRIVER

(71) Applicants: Jeffrey S. Ingber, Philadelphia, PA (US); Peter E. Wiesel, Somers Point, NJ (US)

(72) Inventors: Jeffrey S. Ingber, Philadelphia, PA (US); Peter E. Wiesel, Somers Point, NJ (US)

( * ) Notice: Subject to any disclaimer, the term of this patent is extended or adjusted under 35 U.S.C. 154(b) by 0 days.

(21) Appl. No.: 19/171,101

(22) Filed: Apr. 4, 2025

(51) Int. Cl.
*A61C 8/00* (2006.01)

(52) U.S. Cl.
CPC .................................. *A61C 8/0089* (2013.01)

(58) Field of Classification Search
CPC ......... A61C 8/0089; A61C 1/185; A61C 1/18; A61C 1/08; A61C 1/189; A61B 17/88; A61B 17/8875; A61B 17/58; A61B 17/56; A61B 90/00; B25B 23/1427; B25B 23/1422; B25B 23/142; B25B 23/14
USPC .......................................................... 433/165
See application file for complete search history.

(56) References Cited

U.S. PATENT DOCUMENTS 9,833,883 B2 12/2017 Wang
11,358,259 B2 6/2022 Johnson et al.
2006/0029907 A1 2/2006 Linder
2007/0281274 A1 12/2007 Schraffran et al.
2010/0298838 A1 11/2010 Walters
2014/0127645 A1 5/2014 Goldenberg et al.
2015/0359572 A1* 12/2015 Reimels ............. A61B 17/7082 606/104
2017/0105813 A1 4/2017 Rash et al.

FOREIGN PATENT DOCUMENTS

CN 101618534 A 1/2010
CN 212913433 U 4/2021
DE 202010002860 U1 11/2010
WO WO2014/110905 A 7/2014

OTHER PUBLICATIONS

ISR and WO of PCT/US2026/022348 (Jun. 2, 2026).

* cited by examiner

*Primary Examiner* — Eric J Rosen
*Assistant Examiner* — Mirayda A Aponte
(74) *Attorney, Agent, or Firm* — Caesar Rivise, PC

(57) ABSTRACT

A dental implant driver tool is designed to be used fully within a patient's mouth, providing the dentist with enhanced control and precision. A dental implant push driver dental tool includes a spiral drive mechanism that translates axial motion into rotational motion, allowing for accurate dental application. The push driver eliminates the need for wrist-twisting motions by converting linear force into rotational movement, reducing user fatigue. The dental implant ratchet driver tool provides controlled rotational motion, ensuring that the dental components are securely fastened or removed without over-torquing. The ratchet driver provides an ergonomic and compact solution for rapid fastener engagement without continuous repositioning. The dental implant drivers enhance the efficiency and usability of manual fastening tools, which enable one-handed operation while maintaining mechanical simplicity and reliability.

10 Claims, 18 Drawing Sheets

DENTAL IMPLANT DRIVER

FIELD OF DISCLOSURE

The present disclosure relates to dental tools, and in particular, to work tools that are used in the field of dentistry, including driver tools which the dentist uses in the inner space of the mouth, for mounting implants and threading/unthreading various parts (e.g., screws) into or out of a bore.

BACKGROUND

Dental attachment assemblies are known in which a dental attachment device or retention member has a threaded portion at one end releasably secured in a cap or denture attachment housing and a snap engaging formation at the other end for releasable snap engagement with an abutment attached to a tooth root or implant.

The oral health of some people is troubling, with some having dental problems, including decayed teeth, tartar, dental plaque, gingival bleeding, dentin sensitivity, etc. Teeth are treated and cured by using special tools, wherein the tools are used for ensuring the stability and safety of connection, such as screw extraction or tooth implantation.

The dentist is routinely in need of actuating an accurate and limited controlled moment in a rotational movement unto components that serve him in his actions when providing rehabilitant treatments such as, for example—mounting implants, installing restorations (crowns, bridges, prosthesis), dental procedures of the mouth and jaws (e.g., Maxillofacial Surgery) and other dental treatments.

Many dental implants resemble a screw that is threaded into the bone of the jaw. A dental implant is typically a “masonry anchor” having dual (double) threads. The first one is external and serves to anchor the implant to the bone of the jaw, the second one is internal and serves to anchor external accessories unto the implant (restoration assemblies). Actuating a rotational moment on the implant and on threaded components that are sometimes on it (as a part of the restoration assemblies) has to be accurate and limited in order to avoid excess stress induction on the components (that at certain cases include components that might be cracked due to excess stress on them) as well as on the jaw of the patient that accepts into it the implant that is threaded into it. This and more—variations of implant types, screws and the specific patient are liable to confront the dentist facing challenges of specific compatibility of the rate of the rotational moment that he is required to exert in each specific case.

Thus, the dentist that is utilizing dental implants is required, as a matter of routine, to exert an accurate and limited moment, and this, it has to be remembered—in a rotational motion that is executed inside the wet mouth confined space, that naturally renders it difficult for the dentist to control the device sufficiently at any given instant. It would be beneficial to have improved dental operational tools that increase dentist control, and reduce operation time and dentist fatigue.

The confined space within the oral cavity presents significant challenges for dental professionals. The limited room to maneuver dental tools and implants can lead to difficulties in accurately positioning and securing components. This spatial constraint often results in increased operation time and fatigue, as dentists must exert precise control over their instruments in a restricted environment.

Additionally, the use of tiny screws and other small components in dental procedures poses a risk of mishandling. These small parts can be inadvertently dropped or misplaced during the procedure, potentially leading to ingestion or aspiration by the patient. Moreover, dental tools used within a mouth moistened with saliva can be inadvertently dropped or misplaced when a dentist alters the handling of the small tool while the tool and dentist’s fingers are inside the mouth. Such incidents not only compromise patient safety but also complicate the dental procedure, requiring additional interventions to retrieve or replace the lost components and tools. Therefore, there is a pressing need for improved dental tools and techniques that mitigate these risks, enhance control, and ensure the safety and efficiency of dental treatments.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

The foregoing and/or other aspects and utilities embodied in the present disclosure may be achieved by providing a dental tool configured for use fully within the person’s mouth, with the reduced diameter shaft configured for rotational motion within any one of the person’s teeth while in the person’s mouth. Examples describe a dental implant driver designed to improve the precision and control during dental procedures, particularly those involving the insertion and removal of dental implants, fasteners and related components. The tool integrates a mechanical system that converts linear or rotational motion into controlled dental application. Exemplary devices are structured to enable intuitive and efficient fastener engagement with minimal effort, and addresses the need for accurate dental procedures within the confined space of a patient’s mouth, thereby enhancing the safety and effectiveness of dental treatments. Exemplary devices are further structured to enable the user to operate the devices with a single hand without needing to remove the hand or adjust the grip of the hand during operation.

According to aspects illustrated herein, an exemplary dental tool for installing and uninstalling dental implant components in a mouth of a patient may include a spiral drive mechanism and a shaft assembly. The spiral drive mechanism includes a handle and a middle sleeve, with the handle having an upper housing, a base, and a sleeve aperture with a central axis extending along its length. The middle sleeve is attached within the handle along the central axis, and has a proximal end slidingly extended within the upper housing via the sleeve aperture and a distal end having a shaft aperture, the handle and middle sleeve attached to have a spiral drive mechanism. The shaft assembly includes an enlarged portion and a reduced diameter shaft. The enlarged portion is housed within at least one of the middle sleeve and the upper housing along the central axis. The reduced diameter shaft extends along the central axis from the enlarged portion through the shaft aperture and from the handle to a distal tip. The shaft assembly is slidably engaged with the handle and the middle sleeve to translate axial motion of the handle towards the distal tip to rotational motion of the reduced diameter shaft.

According to aspects described herein, another exemplary dental tool for installing and uninstalling dental implant components in a mouth of a patient may include a ratchet drive mechanism and a dental driver bit. The ratchet drive mechanism includes a handle, and a ratchet wheel connected within the handle along a central axis. The handle has an outer sleeve surface, an inner sleeve sprocket surface with integral gears, and an interior aperture with the central axis extending along its length. The ratchet wheel is connected within the handle along the central axis, and has integral pawls engaging with the integral gears of the inner sleeve sprocket surface, and also a D-shaped internal aperture axially displaced through the ratchet wheel that is partially defined by a flat inner wall surface of the ratchet wheel. The dental driver bit is connected with the ratchet wheel along the central axis. In examples, the dental driver bit has a shaft with a D-shaped upper section and flat sidewall surface at a proximal end of the shaft and a polygonal shaped distal tip. The D-shaped upper section extends into the D-shaped internal aperture and is coupled to the ratchet wheel. The pawls engage with the integral gears to positively lock during a rotational movement of the handle in a first rotational direction and transmit a rotational effect on the shaft distal tip for rotational motion of the shaft. The pawls also slide over the integral gears during a rotational movement of the handle in a second rotational direction opposite the first rotational direction and may transmit insufficient rotational effect on the shaft distal tip for rotational motion of the shaft.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatuses, and systems for dental implant driving tools.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifiers "about" and "substantially" used in connection with a quantity is inclusive of the stated value and has the meaning dictated by the context (for example, it includes at least the degree of error associated with the measurement of the particular quantity). When used with a specific value, it should also be considered as disclosing that value. For example, the term "substantially 2" also discloses the value "2" and the range "from about 2 to about 4" also discloses the range "from 2 to 4."

The term "patient" as used herein refers to the subject of a dental procedure, which is an animal, preferably a mammal and more preferably a human.

The expression "dental implant components" as used herein refers to objects that are installed into and/or removed from implant fixtures by rotational movement.

Figure 1:
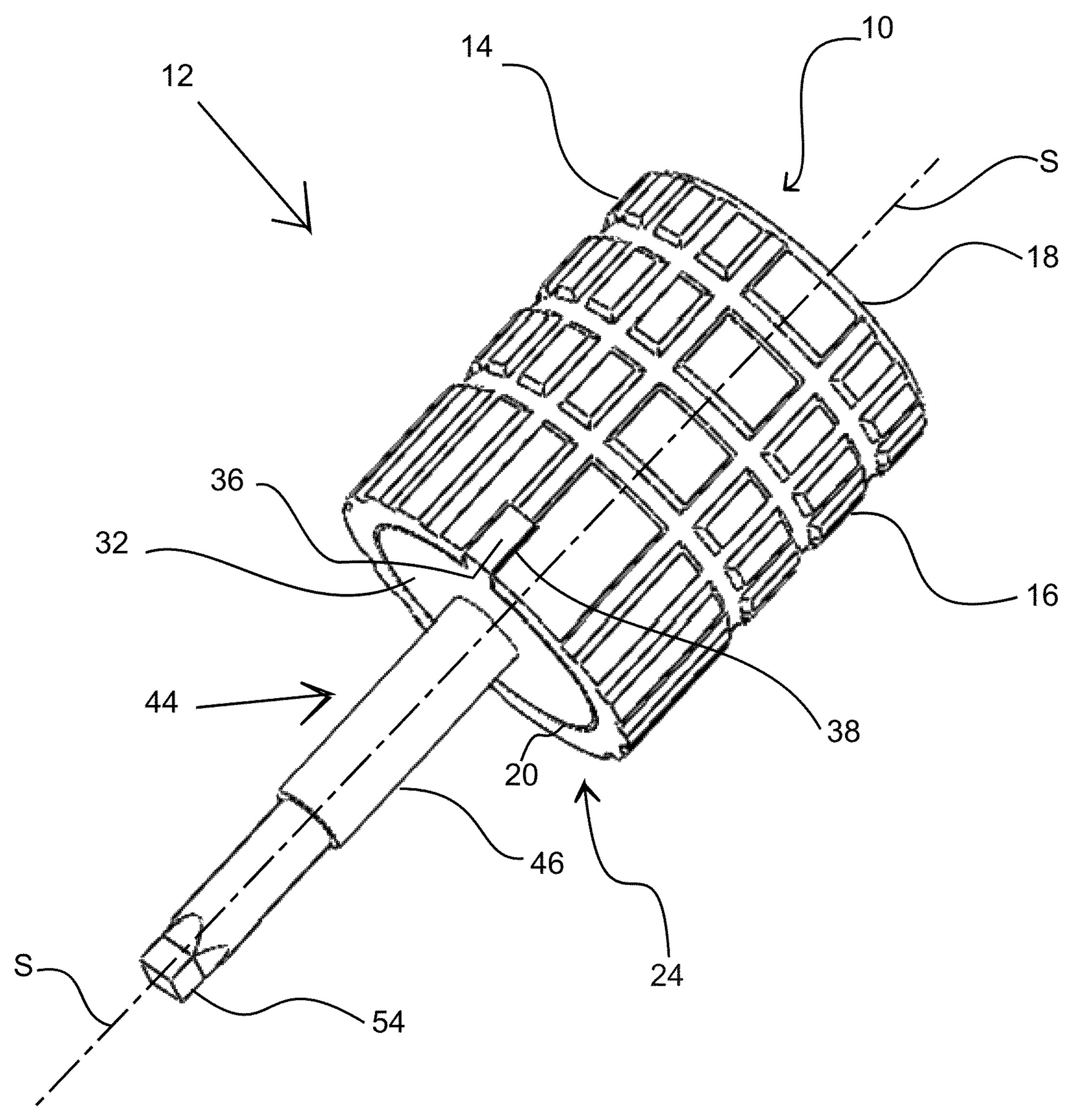
FIG. 1 is a perspective view of a push driver tool in accordance with examples of the embodiments.
Figure 2:
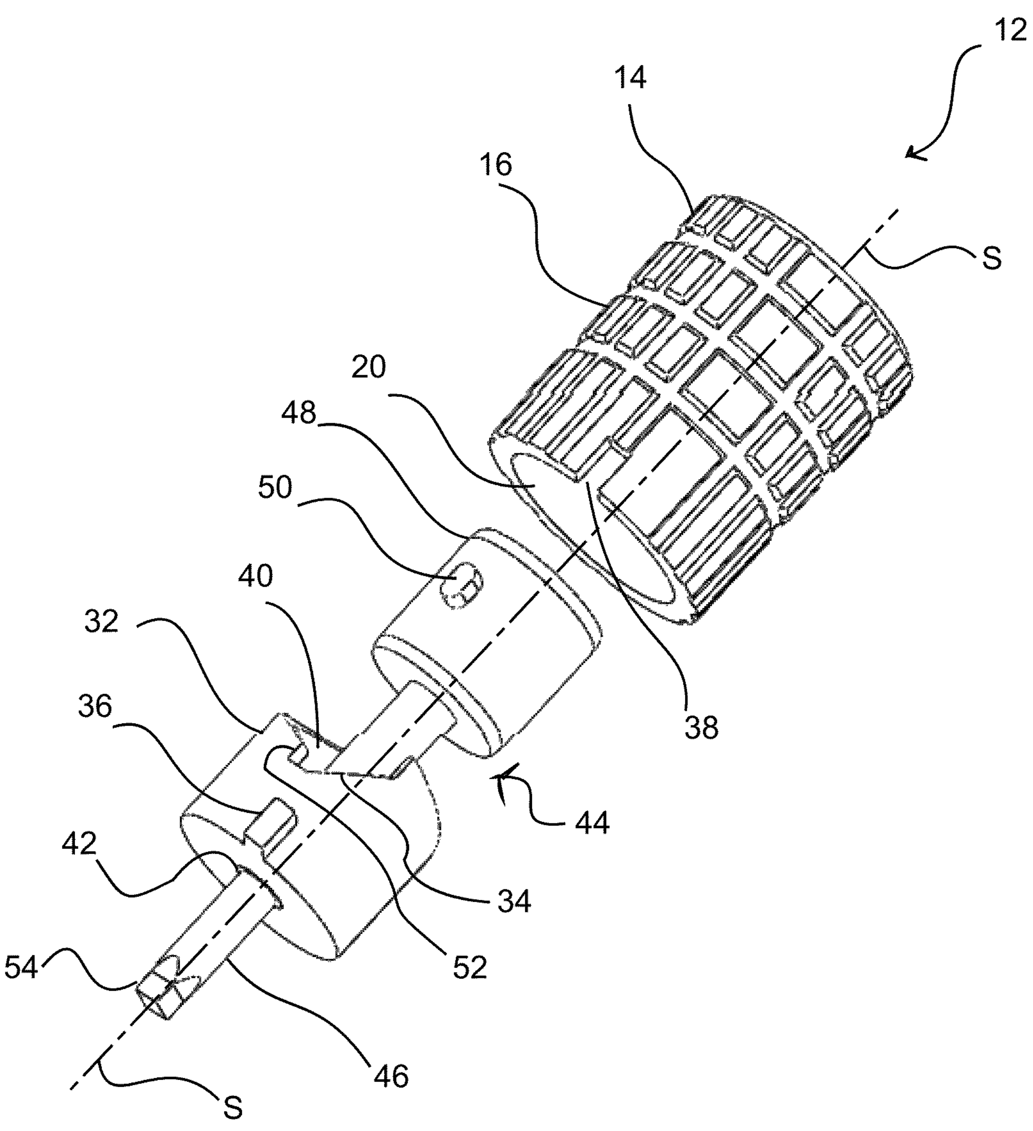
FIG. 2 is an exploded perspective view of the push driver tool of FIG. 1.

Reference is made to FIGS. 1-8, which depict a push driver 12 example of a dental implant driver tool 10 in several views. FIG. 1 illustrates the push driver 12 in perspective view. FIG. 2 depicts the push driver in exploded perspective view.

Push driver 12 includes a spiral drive mechanism 24 and a shaft assembly 44. The spiral drive mechanism 24 includes a handle 14 as an upper sleeve cylindrical housing with an outer surface that may have an uneven gripping surface 16 with grooves and/or bumps for more secure handling, a base 18 and a sleeve aperture 20 with a longitudinal central axis S extending along its length. While the outer side and surface appear cylindrical in shape, it is understood that the handle shape is not limited to any particular shape, as the handle 14 is designed to be ergonomically comfortable for the dentist to hold and operate.

Figure 3:
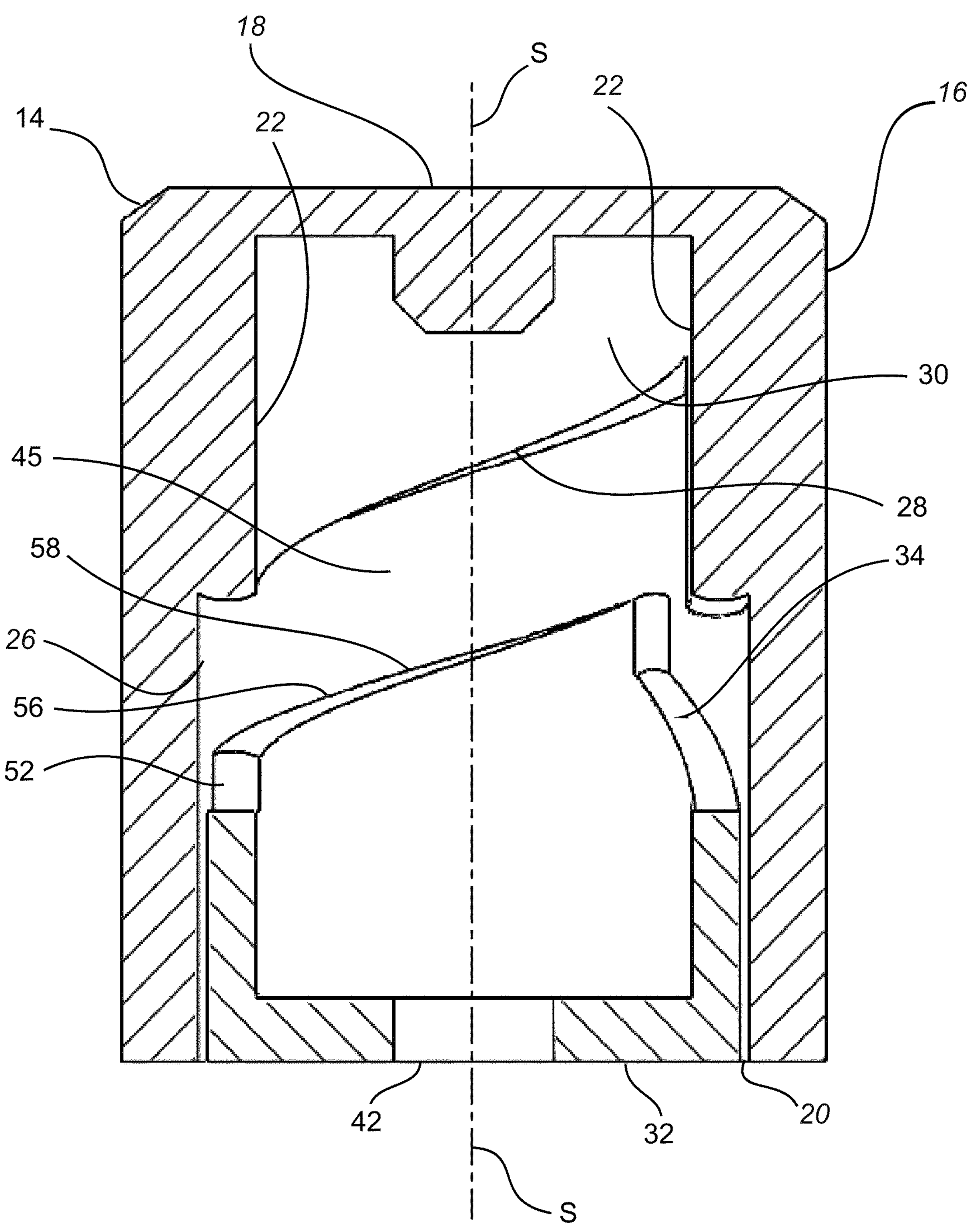
FIG. 3 is a side cross-sectional view of an exemplary handle and middle sleeve housing.
Figure 4:
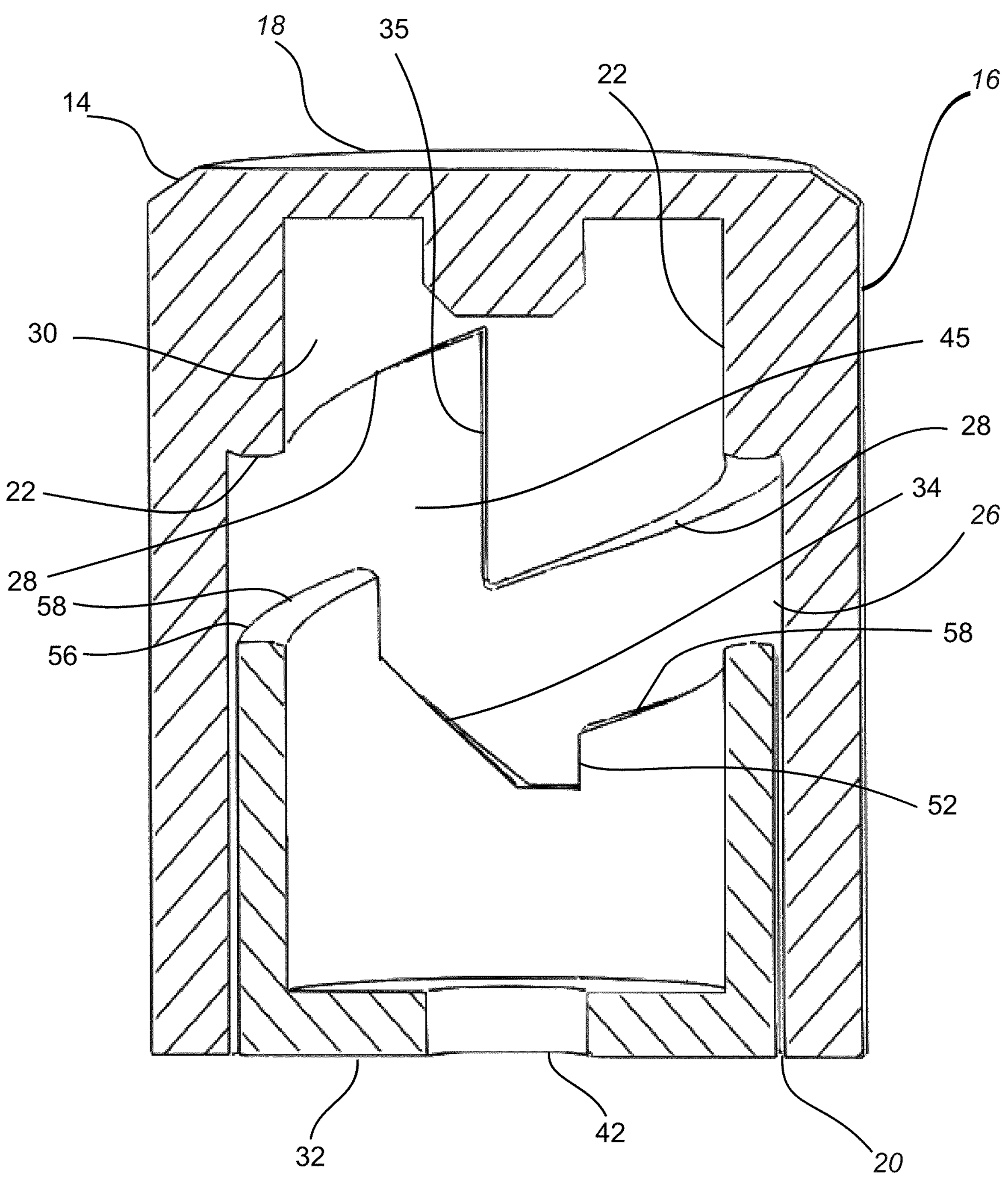
FIG. 4 is another side cross-sectional view of the exemplary handle and middle sleeve housing.

FIGS. 3 and 4 show components of the spiral drive mechanism 24 in sectional views. The handle 14 upper housing further includes an interior wall surface 26 that defines a recess 30 extending from the sleeve aperture 20 towards the base 18. The recess 30 has a reduced diameter section defined by a thickened interior wall section 22 that extends inward towards the central axis S to create the reduced diameter section. The thickened interior wall section 22 has an inwardly extended spiral shoulder with sloped ramp edges 28 having a nonlongitudinal slope angle. In examples, the thickened interior wall section 22 may include a plurality of sloped ramped edges 28, such as two sloped ramp edges on opposite sides across the recess 30. The ramp edges 28 terminate at a respective handle stop wall 35 of the thickened interior wall section 22.

A middle sleeve 32 of the spiral drive mechanism may be fitted within handle 14 along the central axis S. In examples, the middle sleeve 32 has a proximal end with a top edge 56 having a sloped ramp edge 34 slidingly extended within the sleeve aperture 20 of the upper housing, and a distal end having a shaft receiving aperture 42. As can be seen in FIG. 1, the middle sleeve 32 may be attached to the handle 14, for example, via a locating tab 36 of the middle sleeve inserted into a matching locating ridge or slot 38 of the handle.

The shaft assembly 44 translates axial motion of the handle 14 into rotational motion of the reduced diameter shaft 46. Referring to FIGS. 2, and 5-8, the shaft assembly 44 includes an enlarged portion 48 and the shaft 46. The enlarged portion 48 may be housed within the middle sleeve 32 and/or the handle upper housing along the central axis S.

The reduced diameter shaft 46 extends from the enlarged portion 48 through the shaft receiving aperture 42 of the middle sleeve 32 to a distal tip 54. While not being limited to a particular theory, the enlarged portion 48 and shaft 46 may be integrally formed as a single unitary shaft assembly 44, or may be combined as separable enlarged portion and shaft components. The shaft 46 alone may be commonly used for dental procedures as well recognized by a skilled artisan. The distal tip 54 may have a shape configured to engage a dental implant component (e.g., dental bit, threadable screw) for threaded engagement or disengagement with another device or part of a human mouth.

Figure 7:
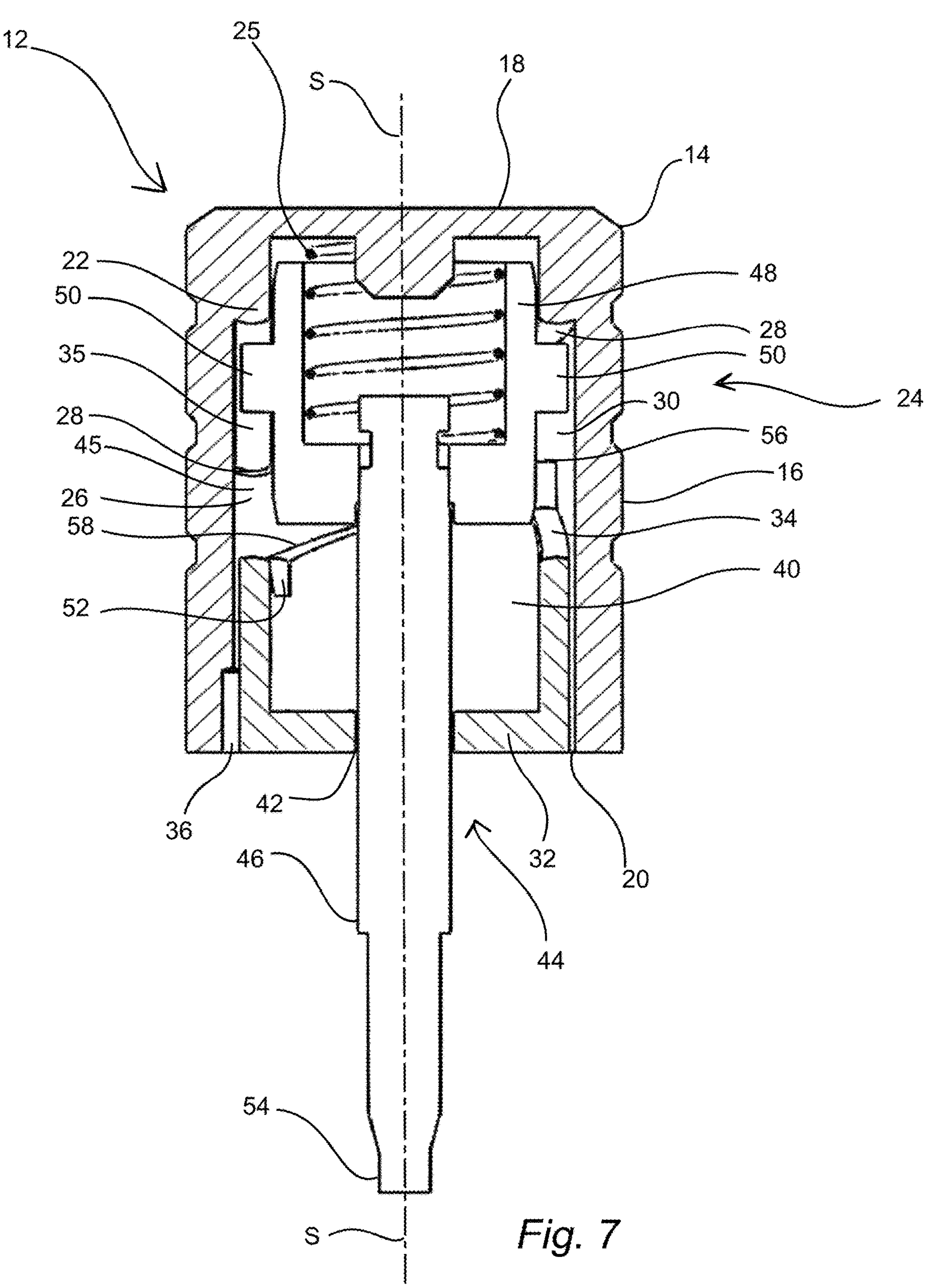
FIG. 7 is a side cross-sectional view of the push driver tool of FIG. 1 at a stage of operation.
Figure 8:
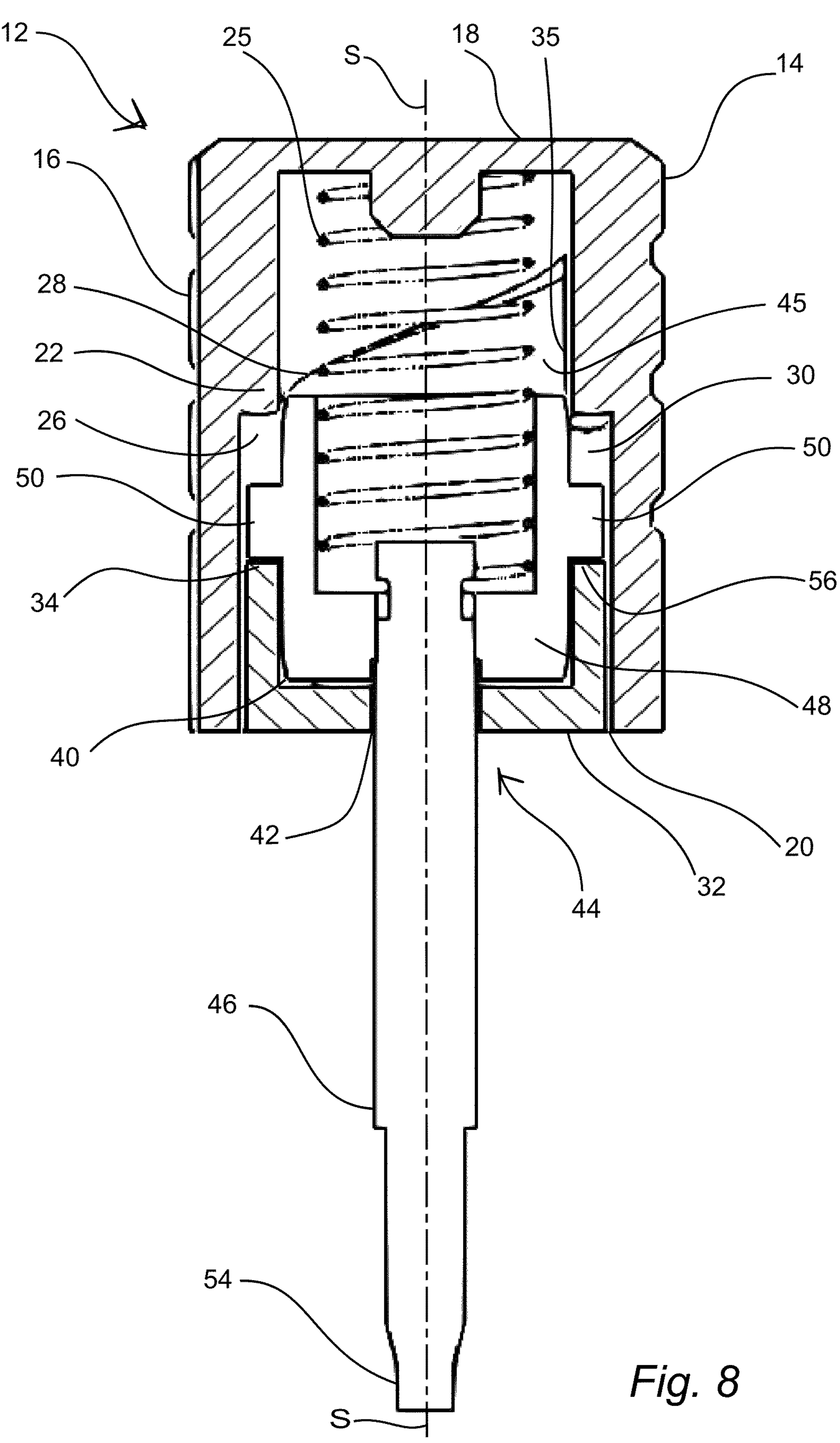
FIG. 8 is a side cross-sectional view of the push driver tool of FIG. 1 at another stage of operation.

FIGS. 7 and 8 depict the push driver tool 12 in cross section from different side views and showing the push driver tool at different stages of operation. The enlarged portion 48 of the shaft assembly 44 has an outer wall with at least one jutted ear 50 (FIG. 2) protruding from the outer wall for sliding engagement with the handle upper housing spiral ramp edge 28 and the top edge 56 of the middle sleeve 32. During a stage of operation (FIG. 7), a downward axial force slides the handle 14 along the central axis S downwards toward the shaft distal tip 54. This causes the one or more jutted ears 50 on the enlarged portion 48 to engage with and slide along the sloped ramp edge 28 within the handle 14, thereby rotating the shaft 46. In other words, the axial motion of the handle 14 towards the distal tip 54 causes jutted ear 50 to slide along the sloped ramp edge 28 and rotate the reduced diameter shaft 46 and distal tip a first direction of rotation. The jutted ear 50 continues along the spiral ramps 28 until they reach a hard stop at the handle stop wall 35 of the thickened interior wall section 22.

Figure 5:
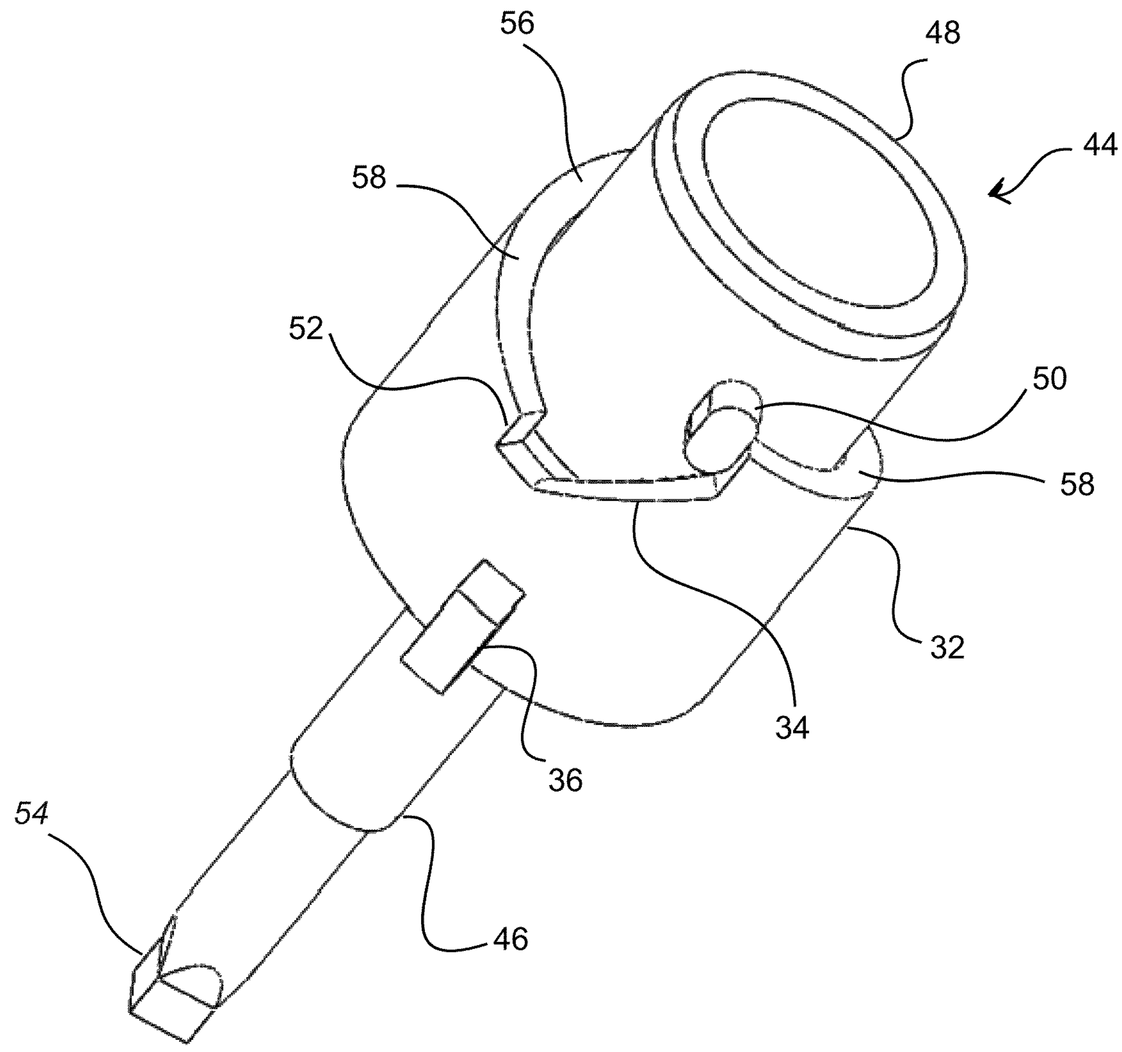
FIG. 5 is a perspective view illustrating an exemplary middle sleeve housing and shaft assembly at a stage of operation.
Figure 6:
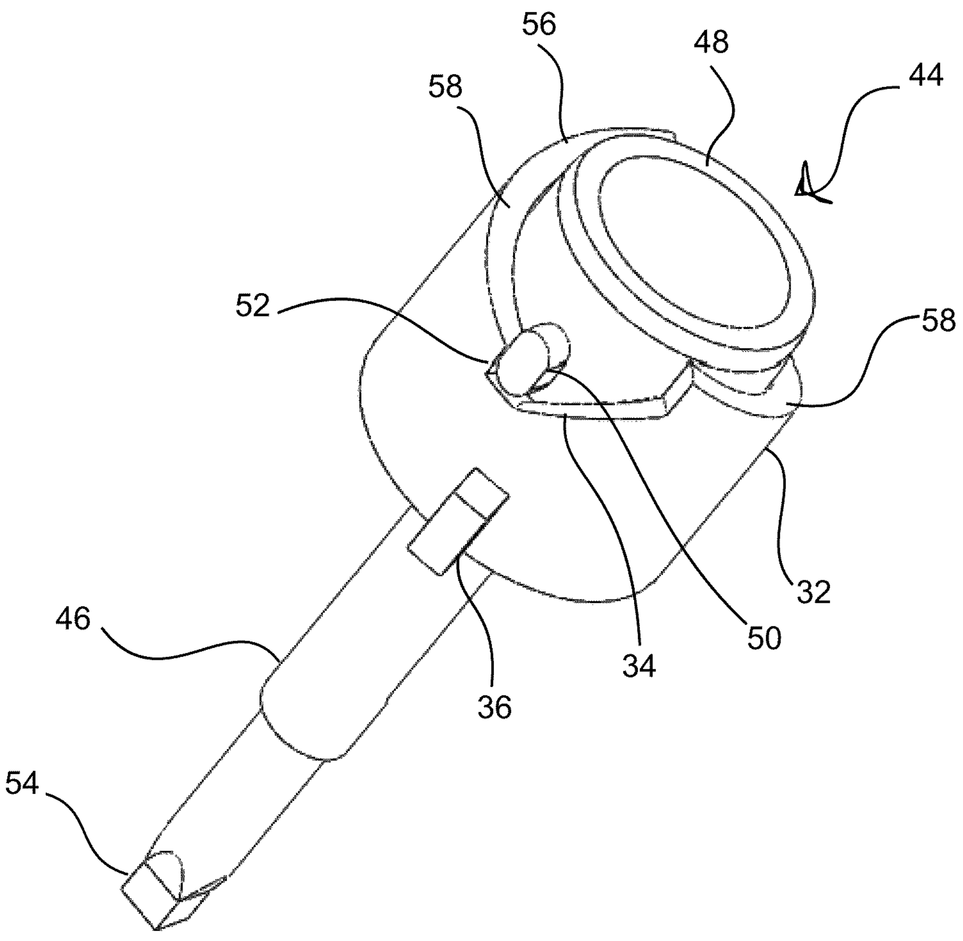
FIG. 6 is a perspective view illustrating an exemplary middle sleeve housing and shaft assembly at another stage of operation.

FIGS. 5 and 6 depict the middle sleeve 32 and shaft assembly slidingly engaged with the shaft 46 extended through the shaft receiving aperture 42 of the middle sleeve. The middle sleeve top edge 56 is illustrated having at least one sloped ramp edge 34 and a pair of softened sloped ramp edges 58. The middle sleeve top edge 56 further includes a middle sleeve stop wall 52 that may have a longitudinal surface configured to stop rotational motion of the jutted ears 50 and thus also the shaft assembly 44 in the first direction and provide a seated position of the shaft assembly with the jutted ear resting in a notch formed by the middle sleeve stop wall and the spiral ramp 34. In some examples, the seated position enables low-torque rotation of the shaft 46 in a second direction opposite the first direction.

As may best be seen in FIGS. 3 and 4, when the middle sleeve 32 is attached to the handle 14 (FIG. 1) the upper handle spiral ramp edges 28 of the handle 14 and the middle sleeve top edge 56 may face each other, with the spiral ramp edges and the top edge defining a channel 45 within which the jutted ears 50 of the shaft assembly 44 may slidingly engage (FIGS. 3 and 4), as discussed in greater detail below. While not being limited to a particular theory, the upper handle spiral ramp edges 28 and softened sloped ramp edges 58 of the middle sleeve may have about the same slope rising (e.g., between about 10 degrees and 40 degrees uphill) clockwise in the channel 45. In contrast, spiral ramp 34 of the middle sleeve appears to fall downwards (e.g., greater than about 40 degrees, at least 45 degrees) clockwise in the channel 45. In this manner, the ramp edge 34 has a slope closer to the longitudinal axis of the central axis S than the slighter slopes of the handle spiral ramp edge 28 and the softened sloped ramp edges 58. This greater downhill slope of the spiral ramp allows the shaft assembly to continue rotation in the first rotation direction during both compression of the handle 14 towards the shaft tip 58 during a downwards axial force applied by a dentist, and during release of the downward axial force and urged separation of the handle away from the shaft tip.

Referring now to FIGS. 7 and 8, the spiral drive mechanism 24 may also include a biasing member, such as a compression spring 25 or other component that resist compression against an axial force. While not being limited to a particular theory, the spring 25 may be seated between the shaft assembly 44 and the base 18 of the handle 14. For example, the spring 25 may be seated longitudinally along the center axis S in the recess 30 of the handle and the enlarged portion 48 of the shaft assembly. The spring 25 is configured in this position to bias the shaft assembly 44 and shaft 46 thereof away from the base 18.

In operation, a forward or downward axial force is applied from the handle 14 to the shaft 46. The enlarged portion jutted ears 50 engage the handle upper housing spiral ramp edges 28, initiating a controlled rotation of the shaft tip 54. This ensures that a user can apply rotational torque simply by pushing the handle 14 forward/downward. The jutted ears 50 continue along the spiral ramp edges 28 until they reach a hard stop at a handle stop wall 35 of the thickened interior wall section 22, ensuring a full initial rotation has been imparted to the shaft tip 54 and associated fastener. After a downwards axial force (e.g., from a dentist) compresses the spring 25 with axial motion of the handle 14 towards the distal tip 54 causing jutted ears 50 to slide along the sloped spiral ramp edges 28 and rotate the reduced diameter shaft 46 and distal tip a first direction of rotation as described above, the axial force may be released.

The biasing member (e.g., spring 25) facilitates automatic resetting of the dental implant driver tool with an additional rotation of the shaft tip 54. As the applied force is released, the shaft assembly 44 is pushed back towards its forward reset position (FIG. 6) by the spring 25. During this motion, the compression spring 25 expands and presses the jutted ears 50 of the shaft assembly 44 to engage and slide along and down the spiral ramps 34. This slide along the spiral ramp edge 34 continues rotation of the shaft 46 in the same first direction of rotation under the bias of the expanding spring until the jutted ears 50 cease rotation at the middle sleeve stop wall 52. This provides a benefit of increased driving rotation of the shaft 46 and tip 54 from axial motion of the spiral drive mechanism 24. That is, there is no counter rotation of the shaft 46 during spring 25 reset, only a continued positive rotation in the driving first direction. A subsequent application of another downward axial force from the handle 14 against the compression spring towards the shaft tip 54 begins another cycle of transferred tip rotation in the first direction.

Figure 9:
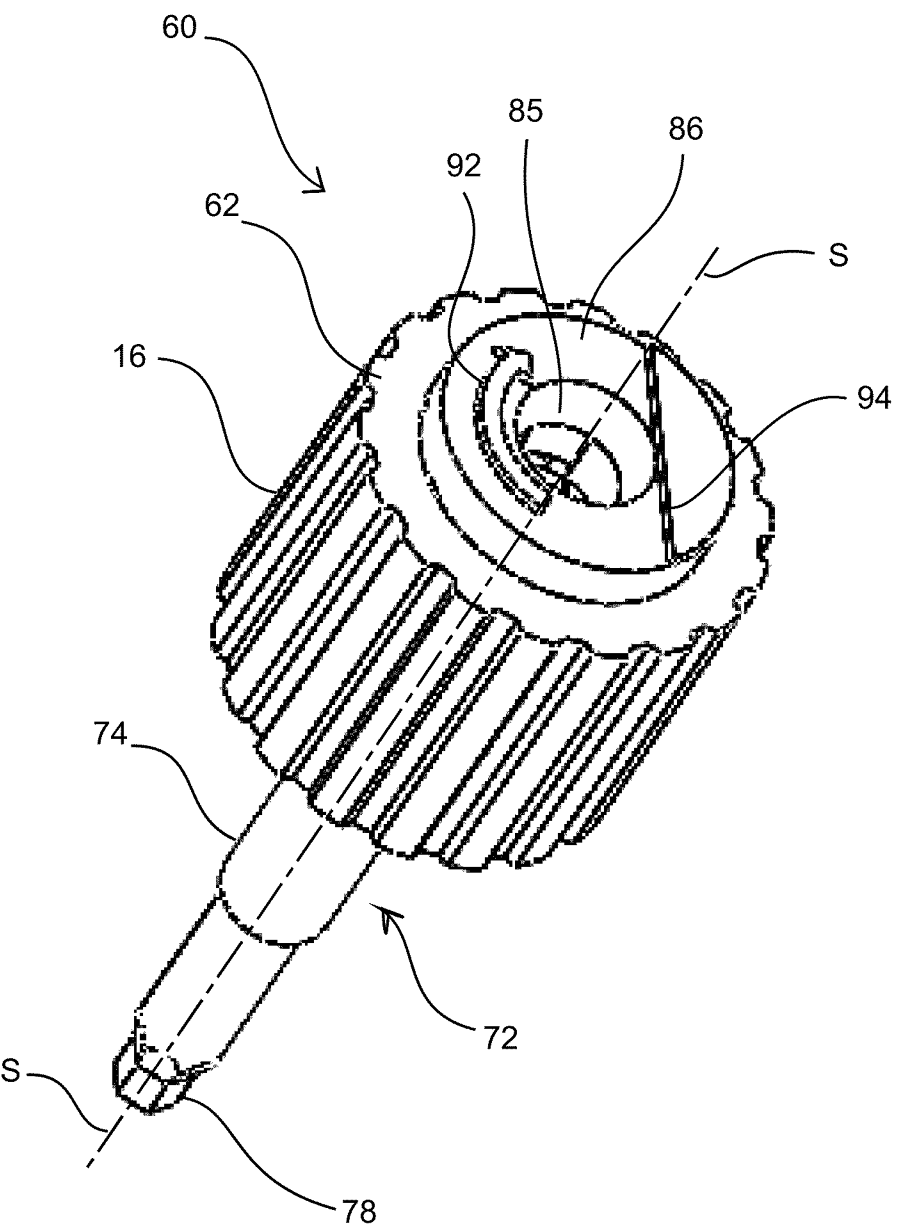
FIG. 9 is a perspective view of a ratchet driver tool in accordance with examples of the embodiments.
Figure 10:
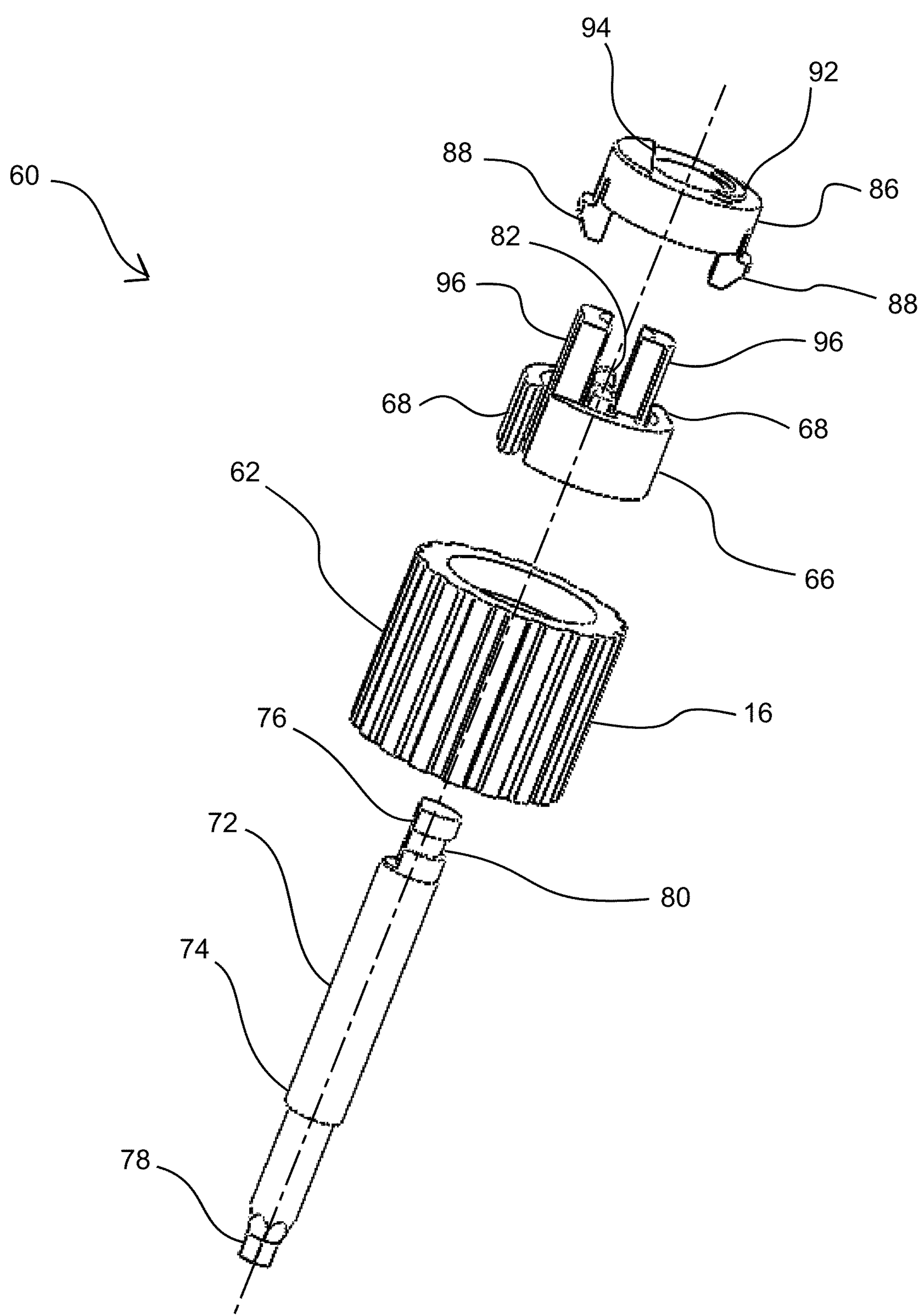
FIG. 10 is an exploded perspective view of the ratchet driver tool of FIG. 9.
Figure 11:
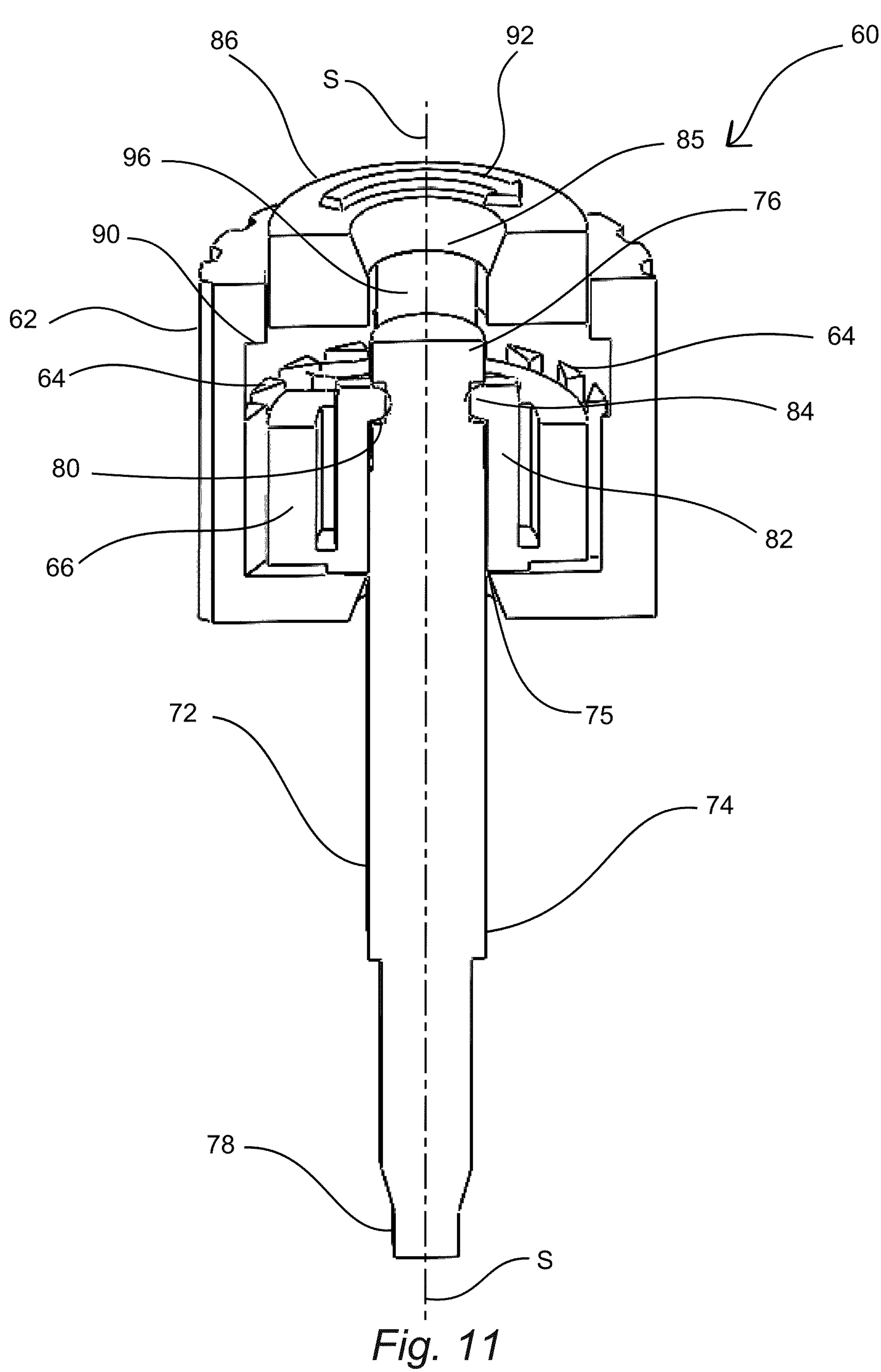
FIG. 11 is a perspective front cross-sectional view of the ratchet driver tool of FIG. 9.
Figure 12:
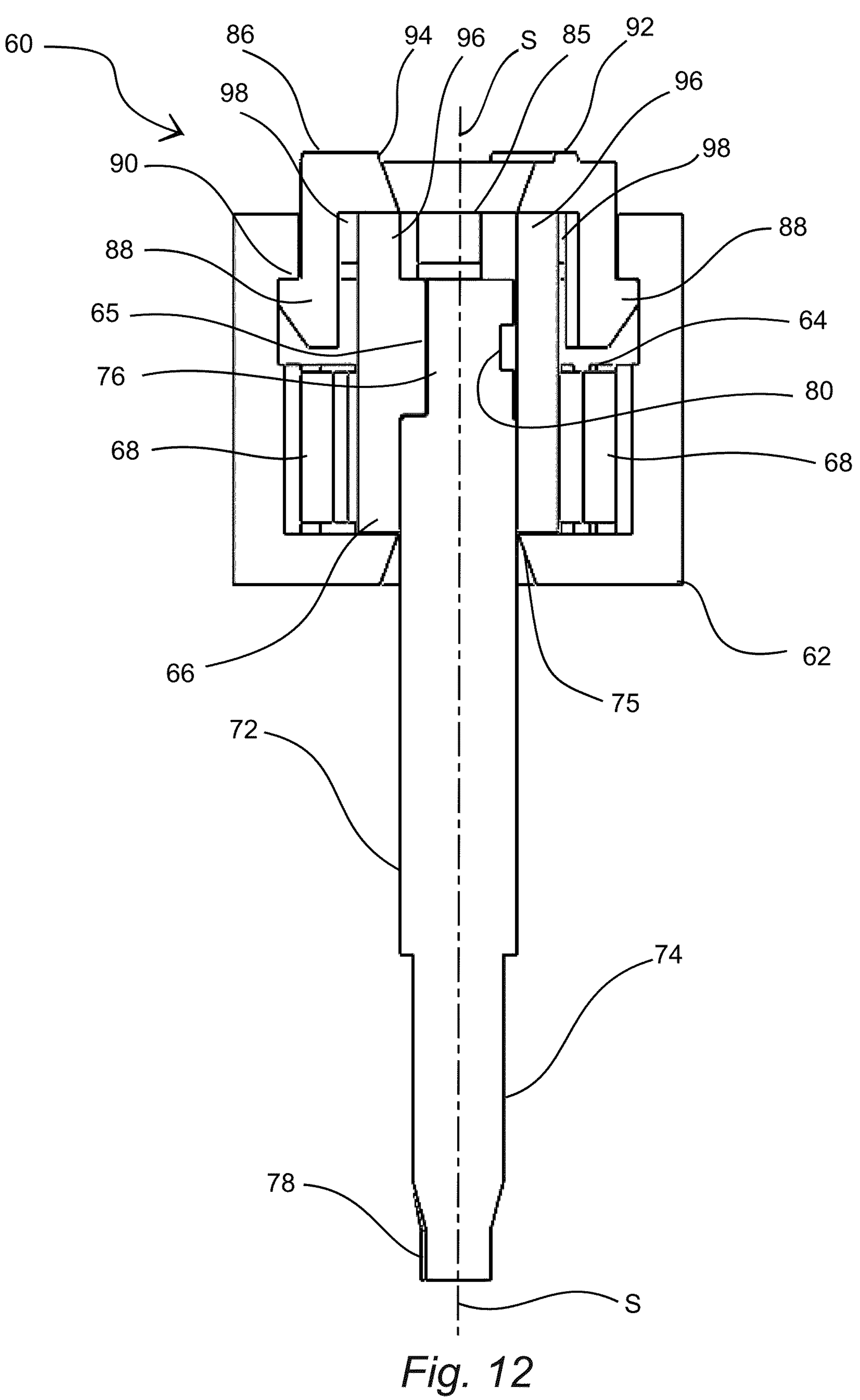
FIG. 12 is a side cross-sectional view of the ratchet driver tool of FIG. 9.

Reference is made to FIGS. 9-16, which depict a ratchet driver 60 example of the dental implant driver tool 10 in several views. FIG. 9 illustrates the ratchet driver 60 in perspective view. FIG. 10 depicts the ratchet driver in exploded perspective view. FIGS. 11 and 12 depict the ratchet driver tool 60 in cross section from different side views. For example, FIG. 11 is a perspective front sectional view showing the ratchet wheel 66 fingers 82 and inward projecting finger tips 84 engaged in the driver bit 72 radial groove 80. FIG. 12 is a side perspective view showing the ratchet wheel 66 uprising arms 96 extended into top cap 86 receiving notches 98, as well as the ratchet wheel flat inner wall surface 65 and D-shaped upper section 76 flat sidewall surface engagement. The ratchet driver is designed for compact and efficient fastening dental operations, allowing users to tighten or loosen fasteners without repositioning their grip. The ratchet driver 60 also provides controlled rotational motion in the small restrictive space of a human mouth, ensuring that the dental components are securely fastened or removed without over-torquing.

Referring to FIGS. 9-12, the ratchet driver 60 includes a handle 62 having an outer sleeve surface that may have an uneven gripping surface 16 with grooves and/or bumps for more secure handling, an inner sleeve sprocket surface with inner gear teeth 64 shaped for a locked engagement in an orbital direction and a slip engagement in an opposite orbital direction, and an interior aperture with a longitudinal central axis S extending along its length. The handle 62 may be partially closed at its bottom to house a ratchet wheel, with a narrowed aperture 75 at the bottom to allow use of a driver bit therethrough. While the outer side and surface appear cylindrical in shape, it is understood that the handle shape is not limited to any particular shape, as the handle 62 is designed to be ergonomically comfortable for the dentist to hold and operate.

Figure 13:
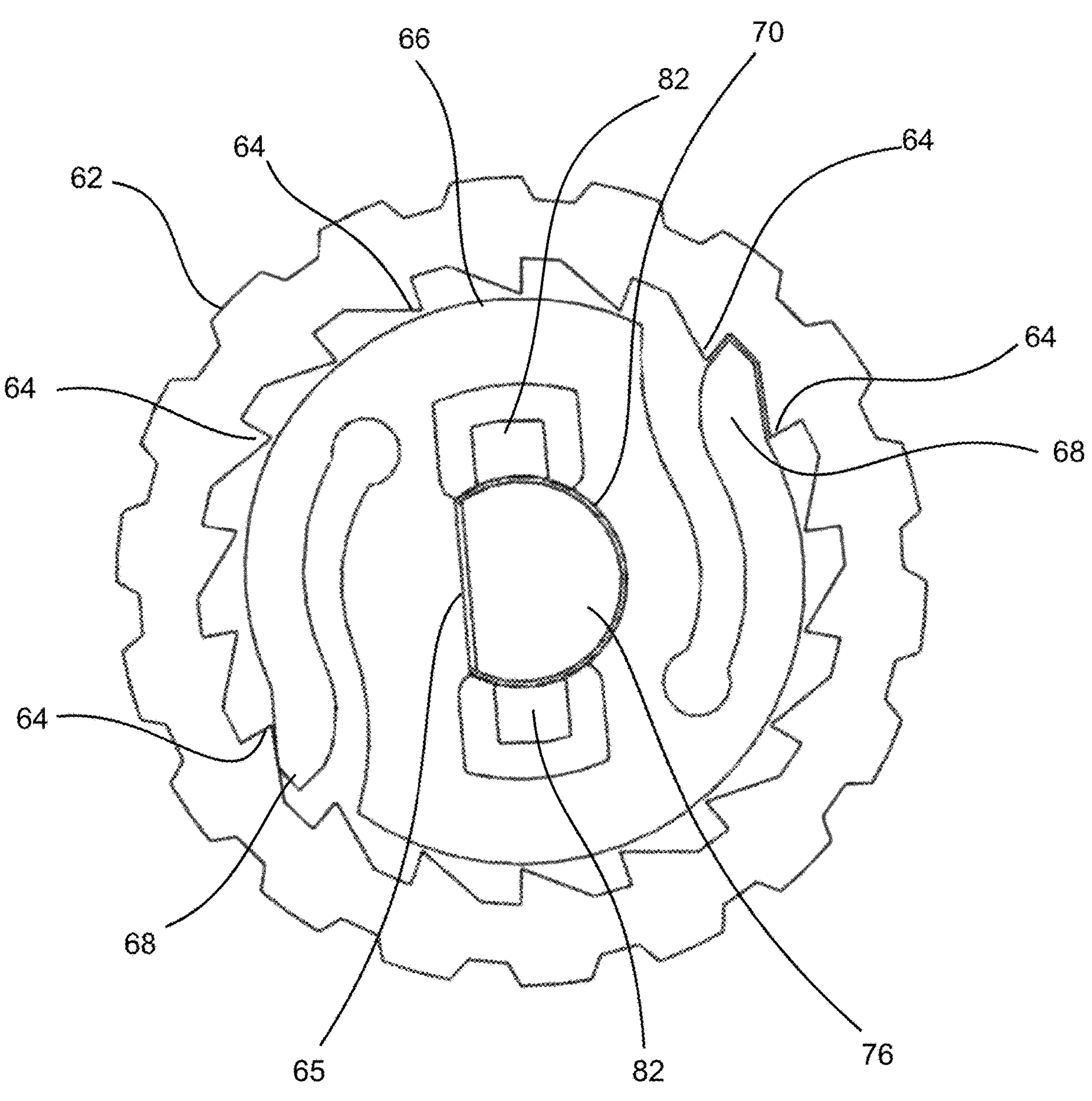
FIG. 13 is a top cross-sectional view of the ratchet driver tool of FIG. 9.

A ratchet wheel 66 is connected within the handle 62 along the central axis S, and includes integral pawls 68, which flexibly engage the inner gears (e.g. inner gear teeth 64) of the of the handle, allowing controlled unidirectional movement. The integral pawls 68 have sufficient elasticity to bend inwards from an expanded initial position against a bias. For example, the ratchet wheel 66 may include plastic, with the pawls 68 using the flexibility of the plastic as a spring mechanism to keep the pawls engaged against the inner gear teeth 64 of the handle. As can be seen in FIGS. 11-13, the pawls 68 engage within and between adjacent integral gear teeth 64 of the inner sleeve sprocket surface. The pawls 68 may be pushed inwards with resistance caused by the shape of the gears at reduced radius portions thereof extended inwardly towards the central axis S. A D-shaped internal aperture 70 is axially displaced through the ratchet wheel along the central axis S (FIGS. 2-4). The aperture 70 is partially defined by a flat inner wall surface 65 of the ratchet wheel 66.

The ratchet wheel 66 attaches to a dental driver bit 72 along the central axis S. The dental driver bit 72 includes a shaft 74 with a D-shaped upper section 76 and flat sidewall surface at a proximal end of the shaft and a polygonal shaped distal tip 78. The D-shaped internal aperture 70 of the ratchet wheel 66 may receive the D-shaped upper section 76 for attachment (FIGS. 11-13). The shaft 74 also includes a radial groove 80 around an outer surface at the D-shaped upper section.

The ratchet wheel integral pawls 68 engage with the inner gear teeth 64 and positively lock therein during a rotational movement of the handle 62 in a first rotational direction and transmit a rotational effect to the driver bit 72 for rotational motion of the distal tip 78. The pawls 68 are configured to unlock against the inner gear teeth 64 during a rotational movement of the handle 62 in a second rotational direction opposite the first rotational direction and slide over the integral gears during the rotational movement of the handle in the second rotation direction. This rotation of the handle 62 in the second rotational direction disengages the pawls 68 from locked rotation from the handle onto the shaft distal tip.

While not being limited to a particular theory, as an approach to increase the number of positive locks around the inner gears, the inner gear teeth 64 teeth may be positioned around the inner sleeve sprocket surface of the handle 62 to allow alternative independent locking of respective integral pawls 68. As can be seen in the cross-sectional top view of FIG. 13, only one pawl 68 is engaged and locked between gear teeth 64. Meanwhile, other pawl 68 rests against one of the gear teeth in a sliding engagement. Upon an incrementally small rotation of the ratchet wheel 66 clockwise with respect to the handle 62, the previously resting other pawl 68 may slide and lock between its adjacent inner gear teeth 64 while the previously lock pawl slides out of its engagement to rest against an adjacent tooth in a sliding engagement. Accordingly, the number of mutually exclusive rotational locks available between the ratchet wheel and the handle is maximized.

Figure 14:
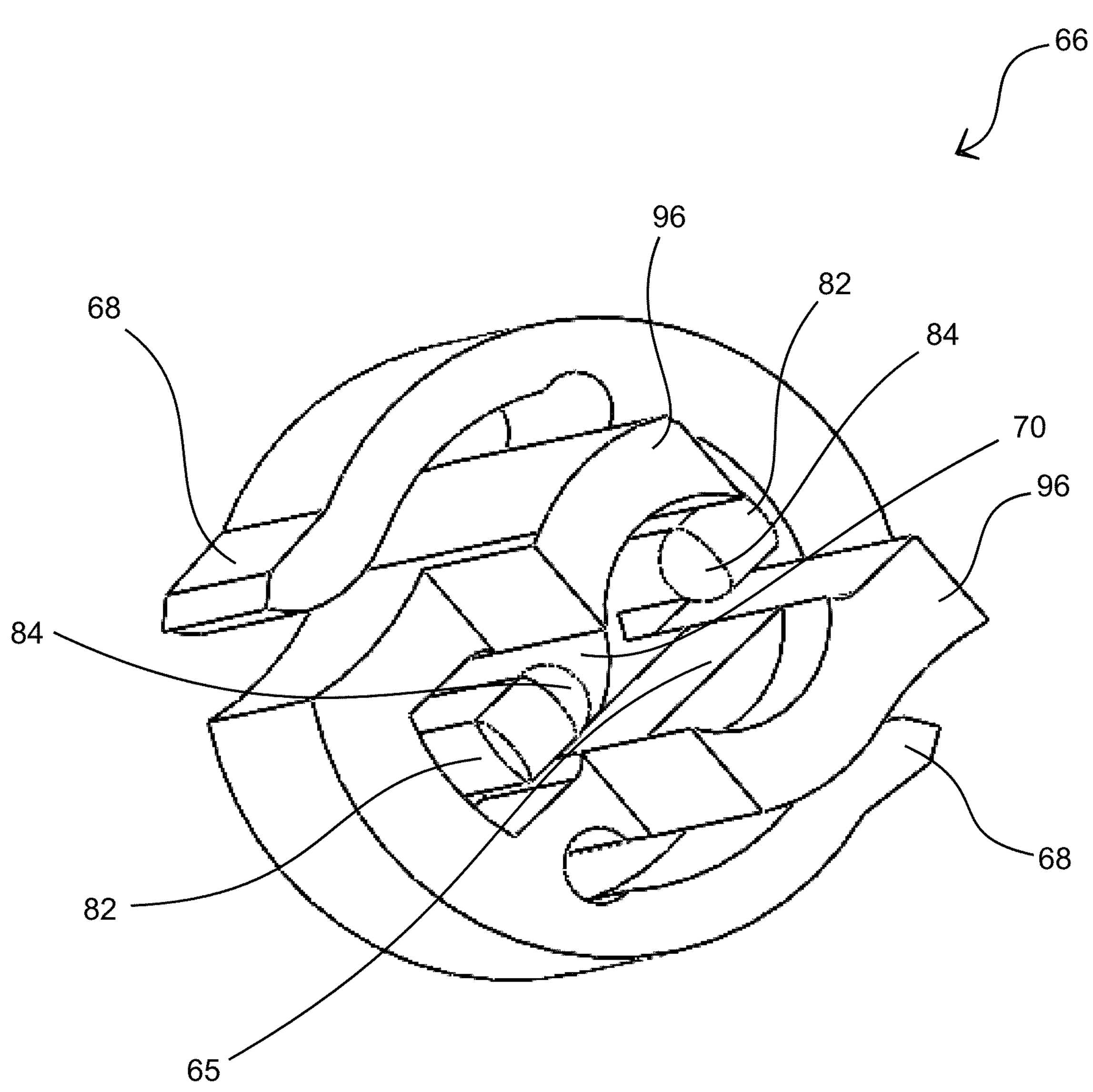
FIG. 14 is a perspective view of an exemplary ratchet wheel.
Figure 15:
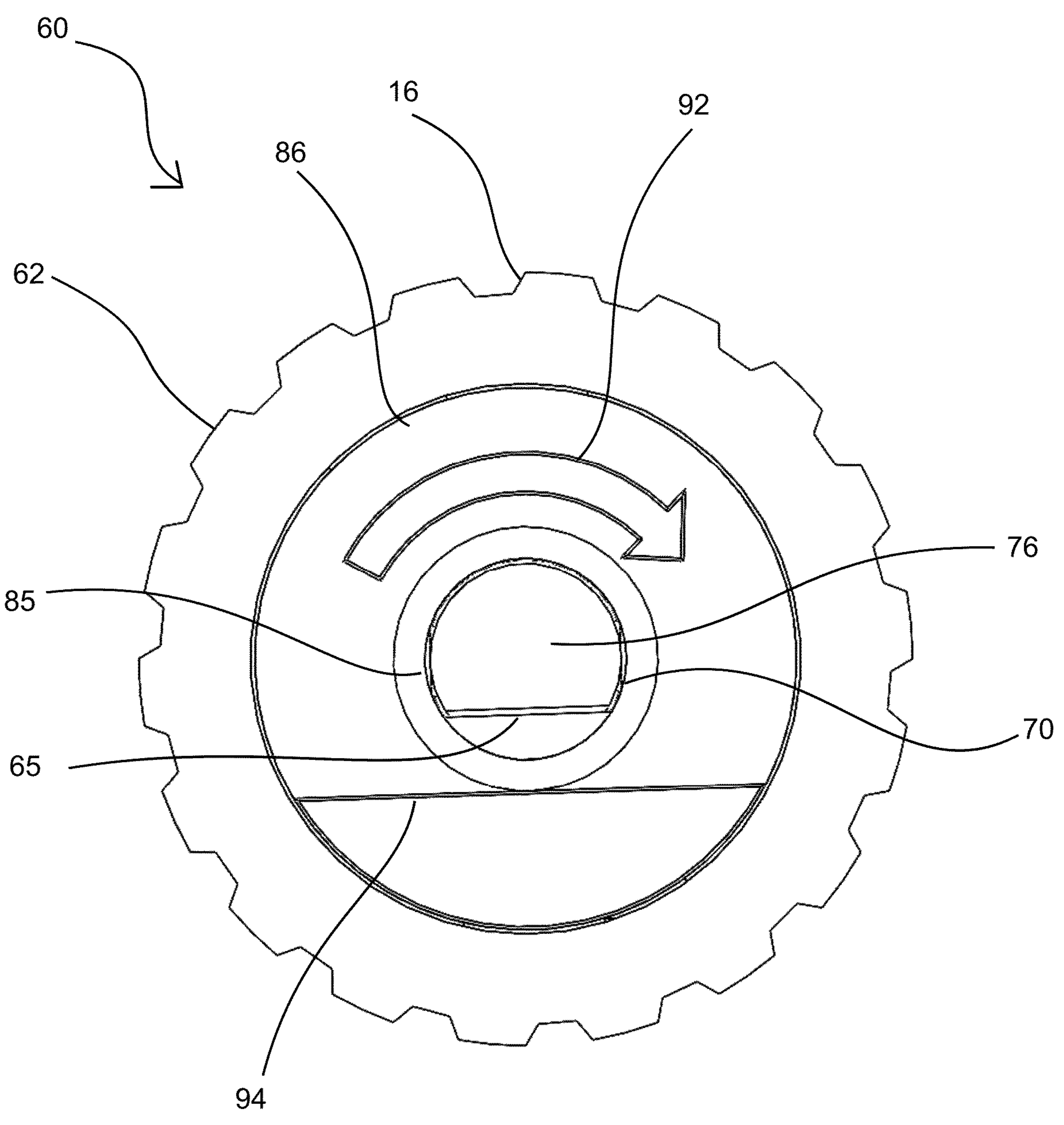
FIG. 15 is top view of the ratchet driver tool of FIG. 9.
Figure 16:
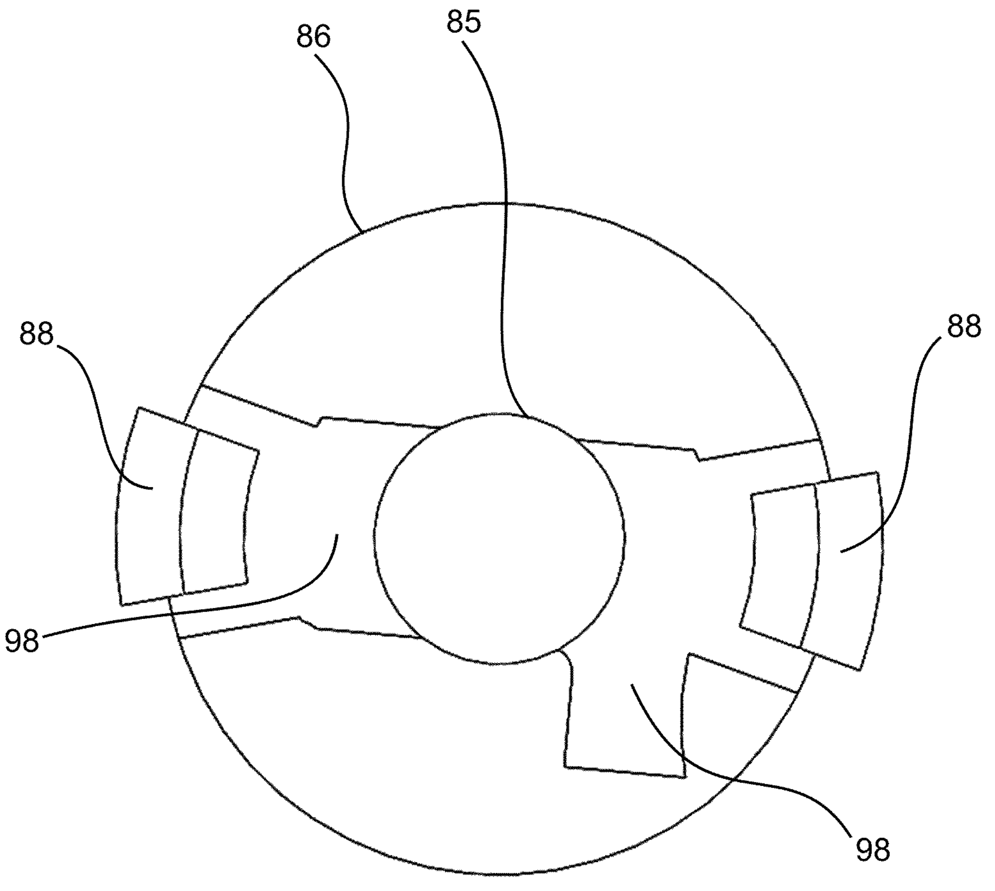
FIG. 16 is a bottom view of an exemplary top cap

The ratchet wheel 66 may also include fingers 82 with inward projecting tips 84 that engage with the bit radial groove 80 upon insertion of the driver bit 72 into the D-shaped aperture of the ratchet wheel 66 (FIGS. 10, 11 and 14). In examples, the fingertip 84 projects into the radial groove 80 for coupling the ratchet wheel 66 to the dental driver bit 72. This ensures a secure fit between the driver bit 72 and the ratchet wheel 66, preventing unintended bit slippage during operation.

Referring to FIGS. 9-12, 15 and 16, the ratcheting driver 60 may also include a top cap 86 slidably engaged within and rotatable against the handle 62. The top cap 86 may be secured to the handle 62 via side tabs 88, which may extend from the top cap downwards into the interior aperture of the handle with clips that may extend outwards under a lip 90 of the handle (FIG. 12). The side tabs provide an intuitive assembly mechanism by snapping under the handle lip 90. The top cap 86 also includes a directional arrow 92 for easy visualization of locked versus ratcheting action. The top cap

86 further features a D-slot indicator 94 at a raised section of the cap top surface with a surface drop lined to correspond to the alignment of the D-shaped internal aperture 70 flat wall and provide guidance to proper bit alignment during insertion of the driver bit 72 into the ratchet wheel 66.

In order to provide an accurate D-slot alignment indication, the top cap 86 secured to the handle 62 is also fixed in alignment with the ratchet wheel 66. To help attach the rotational the top cap 86 and ratchet wheel 66 in a fixed rotational orientation, the ratchet wheel may include uprising arms 96 that extend into matching cavities or notches 98 extending into the top cap. While two uprising arms 96 are shown in the drawings, it is understood that one arm fitted into the top cap 86 may also fix the ratchet wheel 66 and top cap orientation. When using two or more uprising arms 96, it may be beneficial for one arm to have a different cross section and the top cap a matching different size notch as a key feature on the ratchet wheel/top cap interface to ensure that the D-slot indicator is correctly aligned with the D-shaped internal aperture 70.

Figure 17:
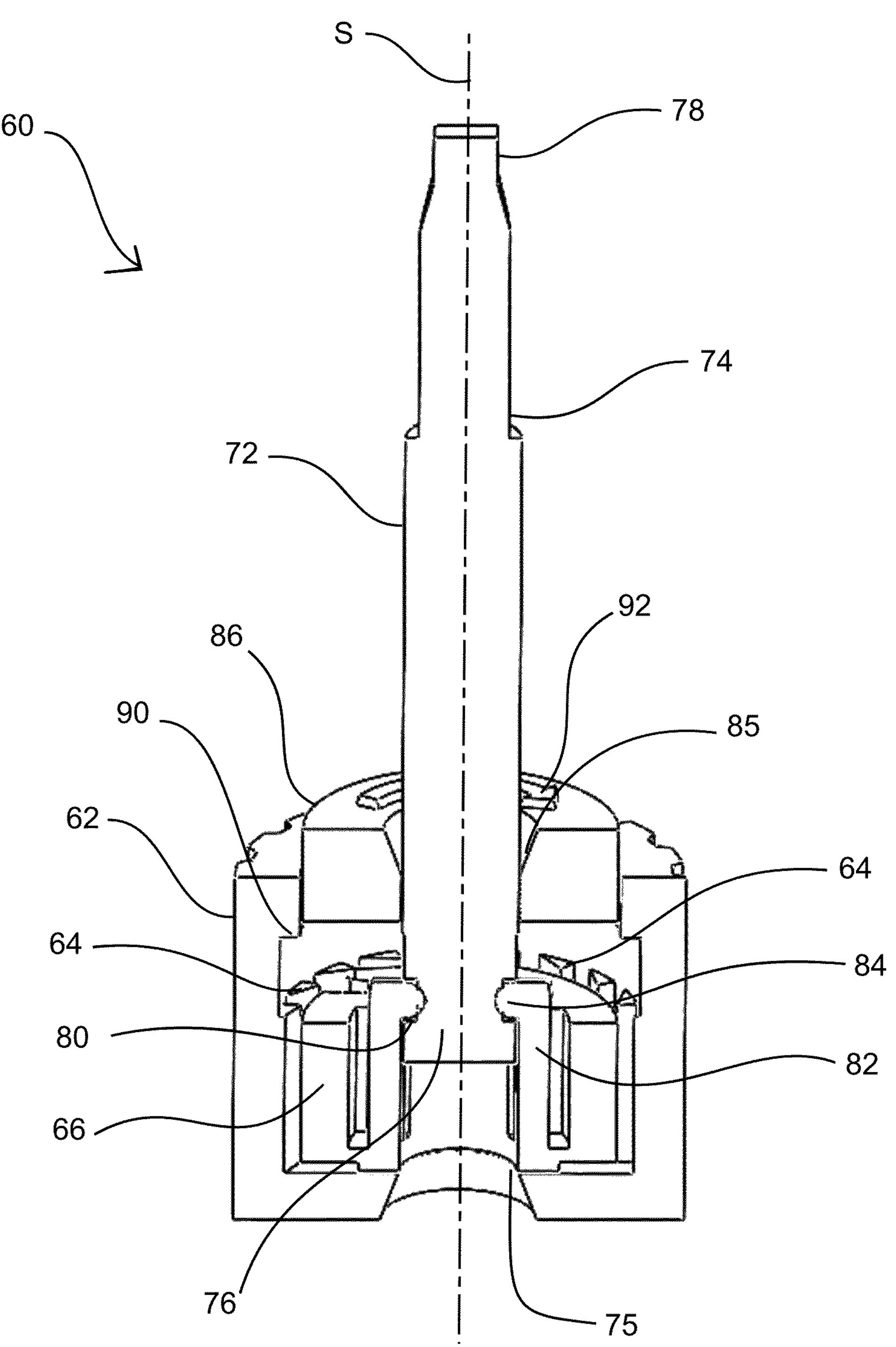
FIG. 17 is another perspective front cross-sectional view of the ratchet driver tool of FIG. 9.
Figure 18:
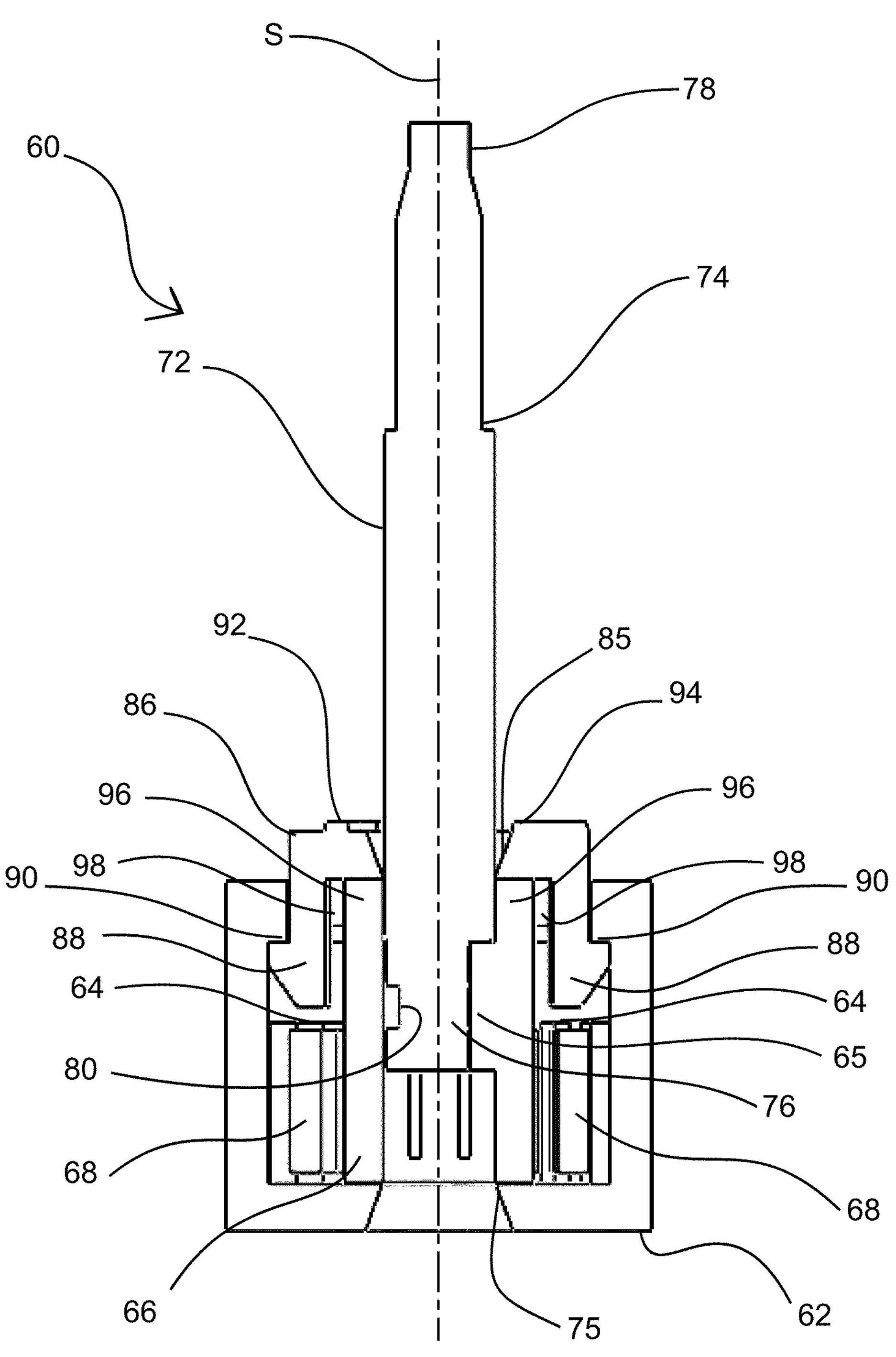
FIG. 18 is another side cross-sectional view of the ratchet driver tool of FIG. 9.

Referring to FIGS. 17 and 18, the top cap 86 may not have a closed top surface base as described above for the push driver tool 12 (FIG. 1). Instead, the top cap 86 of the ratchet driver tool 60 may include an axial aperture 85 along the central axis S. The axial aperture 85 may be sized like the narrowed aperture 75 at the bottom of the handle, as both apertures are configured to allow insertion, removal, and free rotation of the driver bit shaft 74. For driver bit use via the top cap 86, the shaft 74 can be inserted through the top cap aperture 85, D-shaft upper section 76 first, with the flat side of the D-shaft upper section aligned with the D-slot alignment indicator 94. The D-shaft bit section 76 slides down with the flat side of the bit section 76 against the flat inner wall surface 65 of the ratchet wheel 66. The inward projecting tips 84 of the fingers 82 project into the radial groove 80 for coupling the ratchet wheel 66 to the dental driver bit 72 and ensure a secure fit between the driver bit and the ratchet wheel with the driver bit extending out of the top cap 86.

This approach allows use of the driver bit out of opposite top and bottom sides of the handle 62, so a user can switch between tightening and loosening functions by inserting the driver bit 72 into opposite ends of the ratchet driver. That is, the user may switch between the opposite sides of the handle depending on whether the user wants to tighten or loosen a dental component, with the direction of locking or ratcheting determined by the side of the handle receiving the driver bit 72. This allows a compact tool form factor while maintaining full functionality.

While the present invention has been described herein with reference to exemplary embodiments, it should be understood that the invention is not limited thereto. Those skilled in the art with an access to the teachings herein will recognize additional modifications, applications, and embodiments within the scope thereof and additional fields in which the invention would be useful.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein, it is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

LIST OF REFERENCE SIGNS

10 Dental Implant Driver Tool
12 Push Driver
14 Handle
16 Gripping Outer Surface
18 Base
20 Sleeve Aperture
22 Thickened Interior Wall Section
24 Spiral Drive Mechanism
25 Compression Spring
26 Interior Wall Surface
28 Spiral Ramp Edge
30 Recess
32 Middle Sleeve
34 Ramp Edge
35 Stop Wall
36 Locating Tab
38 Locating Slot
40 Lower Housing Aperture
42 Shaft Receiving Aperture
44 Shaft Assembly
45 Channel
46 Shaft
48 Enlarged Portion
50 Jutted Ears
52 Stop Wall
54 Distal Tip
56 Top Edge
58 Softened Sloped Ramp Edges
60 Ratchet Driver
62 Handle
64 Inner Gear Teeth
65 Flat Inner Wall Surface
66 Ratchet Wheel
68 Integral Pawls
70 D-Shaped Aperture
72 Driver Bit
74 Bit Shaft
75 Narrowed Aperture
76 D-Shaped Upper Section
78 Bit Distal Tip
80 Bit Radial Groove
82 Fingers
84 Inward Projecting Finger Tips
85 Axial Aperture
86 Top Cap
88 Downward Extending Side Tabs
90 Handle Lip
92 Arrow

94 D-Slot Indicator
96 Ratchet Uprising Arms
98 Arm Receiving Notches
S Central Axis

What is claimed is:

1. A dental tool for installing and uninstalling dental implant components in a mouth of a patient, comprising:

a spiral drive mechanism including:

a handle having an upper housing, a base, and a sleeve aperture extending along a longitudinal central axis of the dental tool, and a middle sleeve attached within the handle along the central axis, the middle sleeve having a proximal end slidingly extended within the upper housing via the sleeve aperture and a distal end having a shaft aperture; and a shaft assembly having an enlarged portion coupled to a reduced diameter shaft, the enlarged portion housed within at least one of the middle sleeve and the upper housing along the central axis, the reduced diameter shaft configured to extend along the central axis from the enlarged portion through the shaft aperture and from the handle to a distal tip, the shaft assembly slidably engaged with the handle and the middle sleeve to translate axial motion of the handle towards the distal tip to rotational motion of the reduced diameter shaft, wherein:

the upper housing includes an interior wall defining a recess extending from the sleeve aperture towards the base, the recess has a reduced diameter section defined by a thickened interior wall section having an inwardly extended spiral shoulder with a first sloped ramp edge of the interior wall having a nonlongitudinal slope, the shaft assembly enlarged portion includes an outer wall with a first jutted ear protruding from the outer wall into sliding engagement with the ramp edge, and the axial motion of the handle towards the distal tip causes the jutted ear to slide along the first sloped ramp edge and rotate the reduced diameter shaft a first direction of rotation.

2. The dental tool of claim 1, the middle sleeve proximal end having a top edge with a second sloped ramp edge facing the second ramp edge, the first and second sloped ramp edges defining a spiraled channel within which the first jutted ear is slidingly engaged.

3. The dental tool of claim 2, the middle sleeve top edge further includes a stop wall configured to stop rotational motion of the reduced diameter shaft in the first direction and provide a seated position of the shaft assembly.

4. The dental tool of claim 3, further comprising a compression spring within the recess between the base and the shaft assembly to bias the reduced diameter shaft away from the base, wherein the second sloped ramp edge includes a return ramp edge having a slope closer to the longitudinal direction of the central axis than the nonlongitudinal slope of the first sloped ramp edge of the upper housing interior wall, the jutted ear slidingly engaged against the return ramp edge during movement of the reduced diameter shaft away from the base via the bias from the compression spring.

5. The dental tool of claim 2, the outer wall of the shaft assembly enlarged portion further including a second jutted ear protruding from the outer wall opposite the first jutted ear and into sliding engagement within the spiraled channel between the first and second sloped ramp edges.

6. The dental tool of claim 1, the outer wall of the shaft assembly enlarged portion further including a second jutted ear protruding from the outer wall opposite the first jutted ear and into sliding engagement with the first sloped ramp edge.

7. The dental tool of claim 1, further comprising a compression spring within the recess between the base and the shaft assembly to bias the reduced diameter shaft away from the base.

8. The dental tool of claim 1, the upper housing including a locating notch, the middle sleeve including a locating ridge for fitted engagement with the locating notch.

9. The dental tool of claim 1, the distal tip having a shape configured to engage a dental component for threaded engagement or disengagement with another device or part of a human mouth.

10. The dental tool of claim 1, wherein the rotational motion of the reduced diameter shaft is effective to rotate a dental implant component when engaged by the distal tip.

* * * * *